Nov. 4, 1924.  1,514,492
H. V. WILLE ET AL
WELDING TOOL
Filed Jan. 13, 1922  3 Sheets-Sheet 1
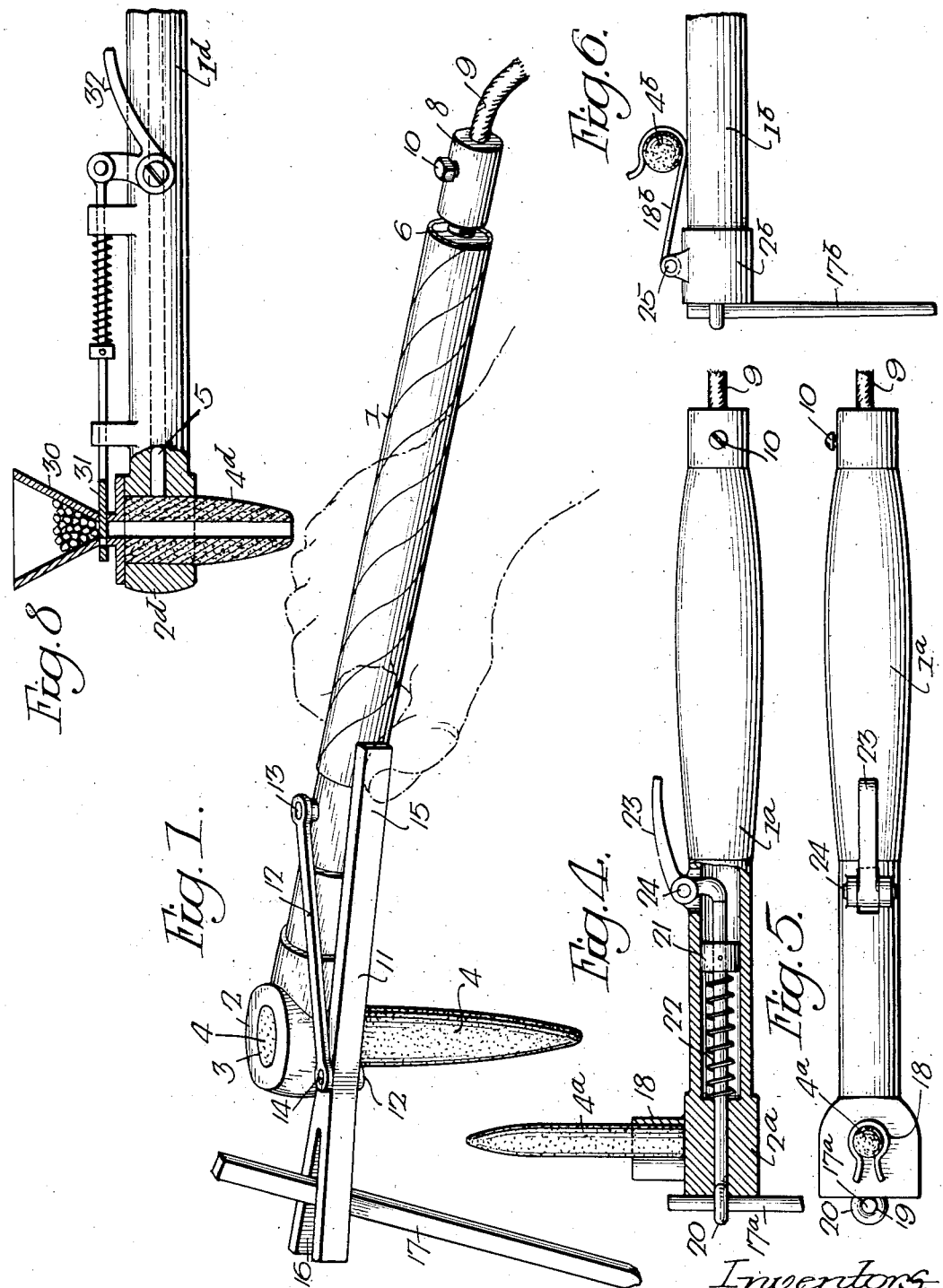
Inventors.
Henry V. Wille, Louis A. Rehfuss
by their Attorneys
Howson & Howson Nov. 4, 1924.　　　　　　　　　　　　　　1,514,492
H. V. WILLE ET AL
WELDING TOOL
Filed Jan. 13, 1922　　　3 Sheets-Sheet 2
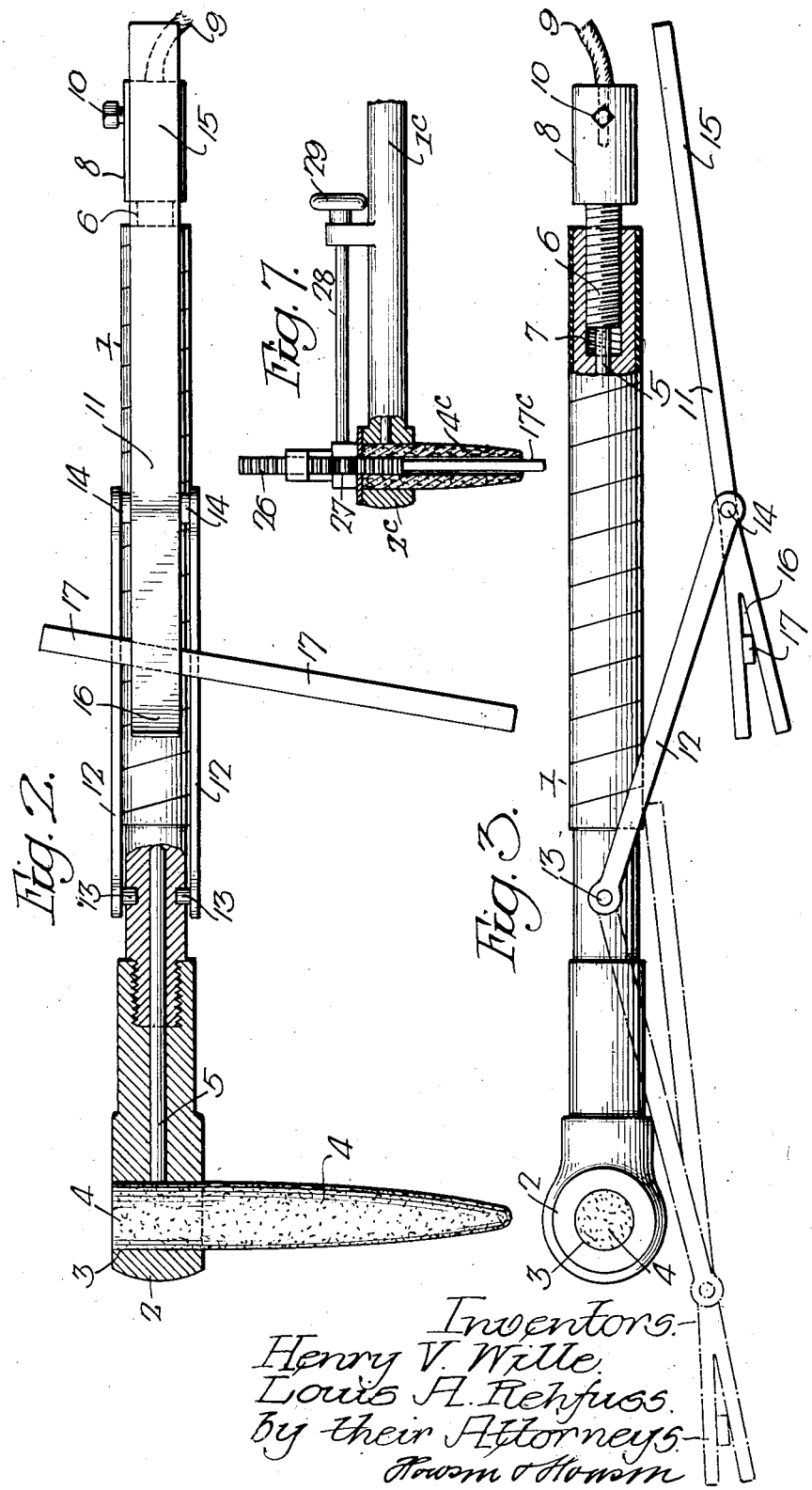

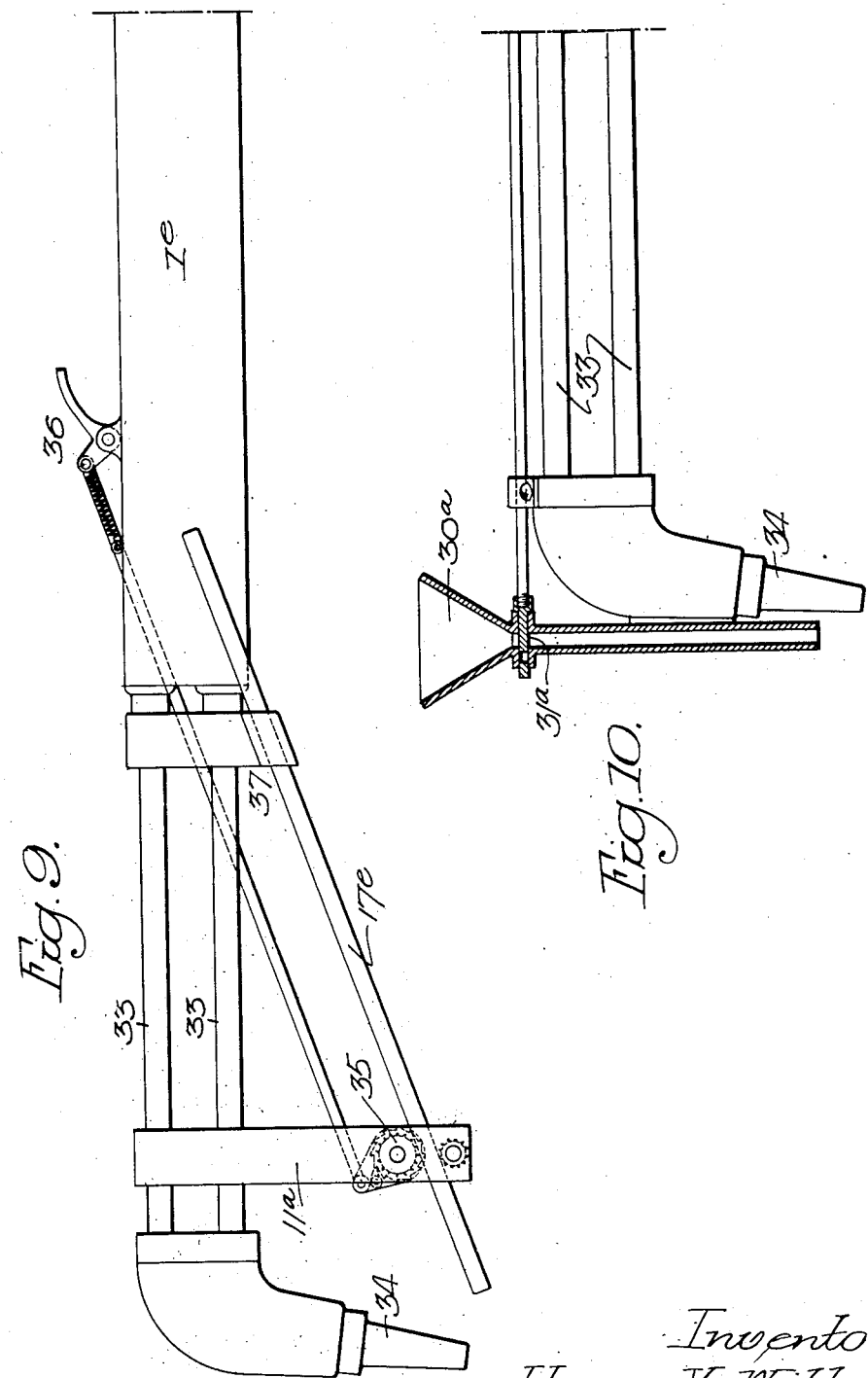

Patented Nov. 4, 1924.

1,514,492

UNITED STATES PATENT OFFICE.

HENRY V. WILLE AND LOUIS A. REHFUSS, OF PHILADELPHIA, PENNSYLVANIA, ASSIGNORS TO THE BALDWIN LOCOMOTIVE WORKS, OF PHILADELPHIA, PENNSYLVANIA, A CORPORATION OF PENNSYLVANIA.

WELDING TOOL.

Application filed January 13, 1922. Serial No. 528,925.

*To all whom it may concern:*

Be it known that we, HENRY V. WILLE and LOUIS A. REHFUSS, citizens of the United States, residing in Philadelphia, Pennsylvania, have invented certain Improvements in Welding Tools, of which the following is a specification.

One object of our invention is to design a welding tool so that the metal to be welded can be preheated, or cut with the same tool that makes the welds.

A further object of the invention is to design a tool for electric welding so that the metal to be added at the weld is carried by the preheating device.

The invention also relates to means whereby the same electric current can be used for preheating, or cutting, as well as welding.

The invention also relates to details, which will be fully described hereinafter.

In the accompanying drawings:

Fig. 1 is a perspective view of one form of our improved welding tool, showing the pencil holder extended;

Fig. 2 is a side view, partly in section, showing the pencil holder retracted;

Fig. 3 is a plan view, partly in section, showing the pencil holder retracted;

Figs. 4 and 5 are views illustrating modifications of the invention, in which the carbon point and top of the pencil are held rigidly to the tool;

Fig. 6 is a view showing the carbon adjustably mounted so that it can be moved into and out of position;

Fig. 7 is a view showing a tubular carbon and means for feeding the pencil through the carbon;

Fig. 8 is a view showing a tubular carbon and means for feeding metallic pellets through the carbon;

Fig. 9 is a side view of a gas torch embodying our invention; and

Fig. 10 is a view of a gas torch, in combination with means for feeding metallic pellets.

Referring to the drawings, 1 is the handle of the welding tool having a screw thread at the forward end in the present instance, adapted to a threaded recess in a head 2 having an opening 3 for the reception of the carbon, or other, point 4, which may be of any length and shape desired.

In order to hold the carbon point, a rod 5 is provided, which extends through the head and through the handle and is adapted to a recess in a screw stem 6, which is adapted to an opening in the rear end of the handle. This screw stem has a head 8, which forms a terminal to which the wire 9 is attached by means of a set screw 10. Other means of fastening the carbon point to the head may be used without departing from the essential features of the invention.

11 is the holder for the pencil, which is connected to the handle 1 by links 12, pivoted to the handle at 13 and to the pencil holder at 14. The pencil holder has a rear extension 15, which may be held by the hand, as shown in Fig. 1, and is forked at the opposite end 16 to receive the pencil 17, preferably made of a metal composition, to form a weld. While the holder is shown as forked to receive the pencil, any suitable means may be provided for securing the pencil to the holder.

In making a weld, it is essential to heat the parent metal to a fusing point so as to expand the defect and insure perfect fusion when the metal of the pencil is added. The pencil often fails to knit well, as in the electric welding of cast iron with cast iron pencils, unless preheating is employed. By the use of the carbon arc, or gas torch, this preheating can be accomplished. The edges of the metal are fused together and no time is lost in substituting the pencil for the carbon, or torch, in making the weld, thus insuring a perfect weld. The expanding of a defect in using electric welding apparatus for welding cast iron is a necessity, as otherwise a shrinkage of the hot weld would tend to pull it away on cooling, which causes many failures in welding and particularly in welding cast iron. It has been found by actual use that the heat can be controlled to the needs of the particular weld.

The tool will also be found very serviceable for cutting the preliminary groove or bevel before welding steel, or other metals, as the edges can be cut away by the carbon, or other cutting means, the weld being made by the same apparatus without requiring the service of a chipper.

In Figs. 4 and 5 are illustrated modifications in which the carbon point 4ª is held by a spring socket 18 on a head 2ª, while the pencil 17ª is passed through an eye 19 in a rod 20, which extends through the head and has a collar 21. Between the collar and the button in the head is a spring 22, which draws the pencil tightly against the end of the head and the trigger 23, pivoted at 24 to the handle 1ª, can be pressed to release the rod from the control of the spring, allowing the removal or adjustment of the pencil.

In Fig. 6 is illustrated a head 2ᵇ in which the pencil 17ᵇ is held in the same manner, as shown in Fig. 4, to the carbon point 4ᵇ, which, instead of being fixed, is mounted in a pivoted clamp 18ᵇ hinged at 25 to the head so that it can be swung into and out of position.

In Fig. 7 a hollow carbon 4ᶜ is shown mounted in a head 2ᶜ. The pencil 17 is carried by a rack 26 engaged by a pinion 27 on a shaft 28 turned by a hand wheel 29 so as to feed the pencil through the carbon as it is used.

In Fig. 8 another modification is illustrated, in which a tubular carbon 4ᵈ is used, which is mounted in a head 2ᵈ. On this head is a hopper 30, which contains a number of metal pellets of substantially the same metal as the pencil 17 and a valve 31 is used, controlled by a trigger 32, which, when the trigger is pressed, allows one or more pellets to pass into and through the tubular carbon.

In Fig. 9 a gas torch is shown, which may be of the ordinary type. 1ᵉ is the handle. 33 are the gas tubes. 34 is the nozzle. 11ª is the holder for the metallic pencil 17ᵉ. This holder has a ratchet feeding means 35, operated by a lever 36 on the handle. In the present instance, a guide 37 is provided for the inner end of the pencil 17ᵉ.

In Fig. 10 a gas tool is illustrated, in which a hopper 30ª for metallic pellets is mounted at the nozzle and provided with an extension terminating close to the end of the nozzle. A valve 31ª is provided for releasing the pellets as required.

In making a weld by any of the modifications shown, the carbon point, or gas torch, can be used to prepare the casting, or object to be welded, either preheating at the point desired, or melting away sufficient metal to prepare a groove, and the pencil can be moved immediately into position to make the weld.

We do not limit ourselves to the particular apparatus shown. The various types described are illustrative of the principle.

We claim:

1. A welding tool having preheating or cutting means; and also having means for feeding metal to the object being welded.

2. A welding tool having preheating means; and also having means for holding welding metal.

3. A welding tool comprising a handle; means for preheating the metal to be welded, said means being carried by the handle; and means, also carried by the handle, for holding the metal to be added to the weld.

4. A welding tool carrying a carbon point, adapted to serve as a preheating electrode and also having means for holding the metal by which the weld is made.

5. A welding tool comprising a handle; a carbon point carried thereby; and a welding pencil, also carried by the handle, and so arranged that the carbon point can be used to prepare the parent metal and the pencil can be used immediately to make a weld.

6. The combination in a welding tool, of a handle having a head; a carbon point carried by the head; and a holder for the welding pencil adjustably mounted on the handle.

7. The combination in a welding tool, of a handle; a carbon point carried thereby; a pencil holder; and links connecting the pencil holder with the handle so that the pencil holder can be moved into and out of position in respect to the carbon point.

8. The combination of a handle; a head thereon, said head having an opening; a carbon point adapted to the opening; means for securing the carbon point to the head; a forked pencil holder; and links connecting the pencil holder with the handle, said pencil holder having an extension at the rear, which can be held by the hand that is grasping the handle.

9. The combination in an electric welding tool, of a point for preheating, or cutting; and means for holding welding metal carried by the tool and in the same electric circuit as the point.

HENRY V. WILLE.
LOUIS A. REHFUSS.